United States Patent Office 3,767,770
Patented Oct. 23, 1973

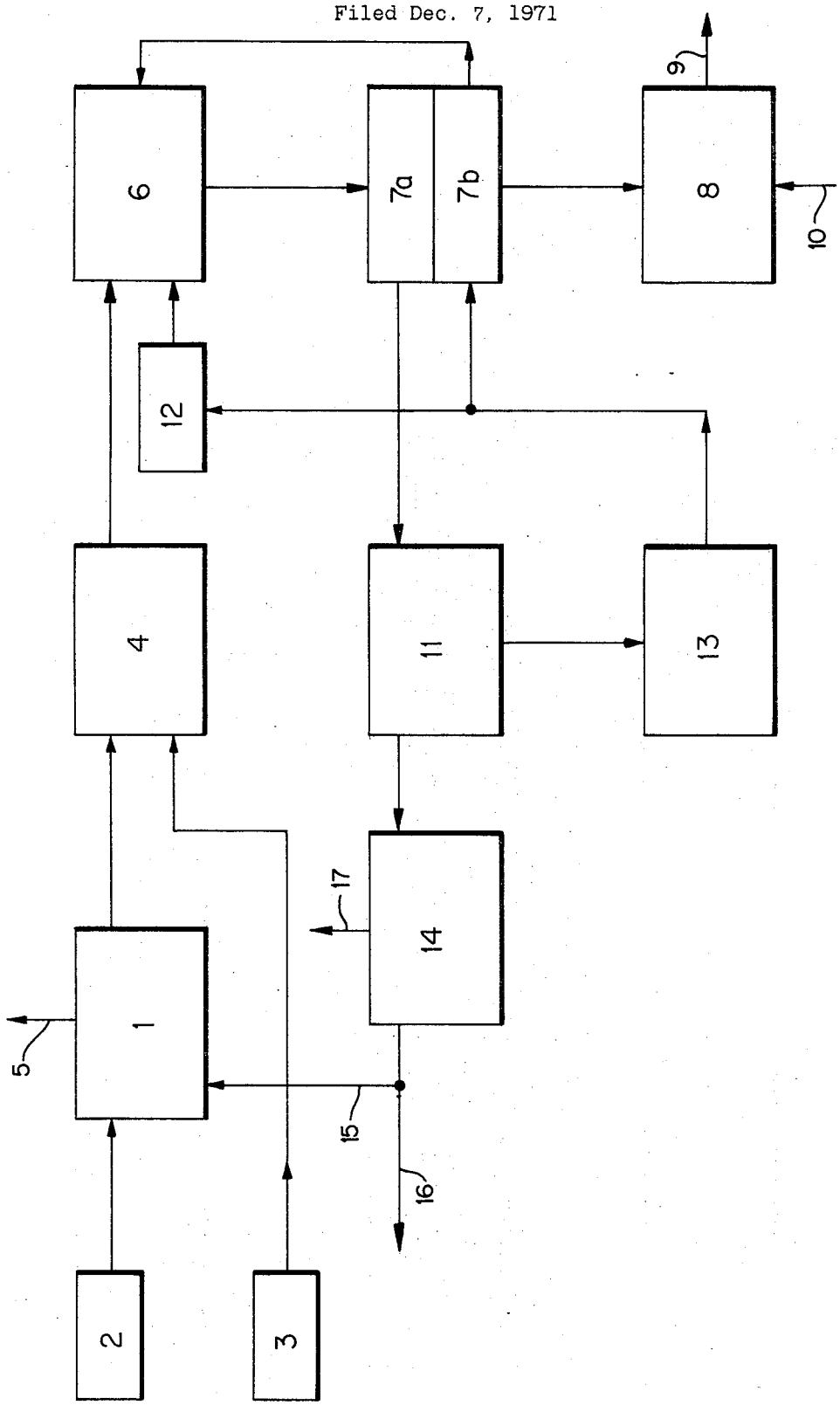

3,767,770
METHOD OF MANUFACTURE OF
POTASSIUM PHOSPHATE
Ralph Eric Worthington, William Henry Thompson, and Thomas Noel Enda Somers, Dublin, Ireland, and Erhart K. Drechsel, Houston, Tex.; said Worthington, Thompson and Somers assignors to Fitzwilton, Limited, Dublin, Ireland, and said Drechsel assignor to Pennzoil Company, Shreveport, La.
Filed Dec. 7, 1971, Ser. No. 205,613
Int. Cl. C01b 15/16, 25/26
U.S. Cl. 423—309          7 Claims

ABSTRACT OF THE DISCLOSURE

There is disclosed a process for the production of potassium dihydrogen phosphate by the reaction of potassium chloride with phosphoric acid which has preferably been concentrated and dehydrated at elevated temperatures, to form a reaction mixture containing potassium phosphate compounds, hydrolyzing the resulting reaction mixture with water, or with aqueous phosphoric acid and precipitating the resultant potassium dihydrogen phosphate product by the addition of an organic liquid.

---

This invention relates to the production of potassium dihydrogen phosphate which is particularly valuable in presenting potassium and phosphorus in a convenient solid form which can be used either as a fertilizer directly or in combination with other components.

According to the present invention this compound is obtained by phosphoric acid or polymerized phosphoric acid attack on potassium chloride.

This invention provides a process for the production of potassium dihydrogen phosphate comprising the steps of reacting phosphoric acid which has preferably been concentrated and dehydrated with potassium chloride at elevated temperatures. During the reaction, hydrogen chloride and some water vapor are evolved and can be collected and used as a marketable product. This reaction is generally conducted at a temperature of about 180°–325° C. with a most preferred operating temperature range of 250°–300° C.

In the reaction the potassium chloride or potash is usually employed as a solid although use of molten potassium chloride through a preheating step would mitigate heat exchange requirements. The phosphoric acid reactant is preferably a concentrated phosphoric acid having a $P_2O_5$ content of about 60–80%, preferably 70–75%, i.e., superphosphoric acid.

In the reaction it has been found that the removal of the hydrogen chloride is a relatively easy matter if the reaction is carried out in the presence of an excess of acid but it is not so easily achieved if stoichiometric quantities are used. Thus, it is a preferred feature of the invention to use excess phosphoric acid. As indicated, superphosphoric acid is preferably employed. However, so called wet process phosphoric acid can also be employed. Irrespective of the acid used, it should be employed in such amount as to provide a P:K ratio in the reaction of above 1.8:1 and preferably 1.8:1 to 5:1. A highly preferred excess of acid to be used is the amount necessary to provide a P:K ratio of 1.9:1 to 2.5:1 in the reaction. The ratios expressed are molar ratios.

Although the separation of the potassium dihydrogen phosphate from the acid liquor may be achieved by crystallization this is not always easy. The preferred method for the separation of potassium dihydrogen phosphate is by the addition of a low boiling point water soluble organic liquid such as an alcohol, ketone or soluble ether. Typical organic liquids which may be used include those which are miscible with water such as the lower alkyl alcohols including methanol, ethanol, isopropanol, etc. as well as lower alkyl ketones such as acetone, methyl ethyl ketone, etc. as well as mixtures thereof. Methanol is highly preferred because of the good results provided and its ready availability. The liquid is usually employed in a weight ratio of liquid to total solution of about 0.5:1 to 3:1, preferably 1:1. The treatment is usually carried out with agitation at a temperature of about 20–60° C. The treatment of the phosphoric acid solution with the organic liquid provides a means whereby substantially all of the potassium dihydrogen phosphate can be caused to precipitate by addition of the organic liquid with substantially all of the phosphoric acid remaining in the solution.

On treatment with the organic liquid the potassium phosphate is precipitated and the acid liquor is then stripped of the organic liquid in a simple distillation column and returned to the process or separated by other means. In order to avoid the precipitation of the solids as as viscous intractable mass it has been found necessary to hydrolyze the complex phosphates in the reaction mass before precipitation. Hydrolysis is carried out by heating with water. The water may be supplied by wet process phosphoric acid which can be one of the raw materials fed to the process. The wet process acid which contains about 20% water is fed to the hydrolyzer and an economy in the operation of the systems results. A significant feature of the hydrolysis step of the process when practiced in a continuous manner is that the source of the water can also be the aqueous phosphoric acid solution fed to the process. Therefore in this manner the hydrolysis can be effected by a feed material of the process. Obviously however, other sources of water for the hydrolysis may be used.

The solids precipitated by the organic liquid are washed either on the separator or by repulping in the organic liquid with subsequent separation. The crystals are dried and sent to storage.

The invention is illustrated by the accompanying drawing which is a flow-sheet of one embodiment of the process.

The apparatus comprises a reactor 1 with a potassium chloride feeder 2, a hydrolyzer 4 with a phosphoric acid feeder 3, which are followed by a precipitator 6, a separator and washer 7, a dryer 8, a distillation column 11, an evaporator 14 and an organic liquid feeder 12 which is fed from a supply 13.

In the operation of the process potassium chloride is fed from feeder 2 and phosphoric acid recycled from the process fed at 15 to the reactor 1 where hydrogen chloride evolved is removed at 5. The mixture of potassium phosphate and phosphoric acid is fed to a hydrolyzer 4 together with wet process phosphoric acid or water from a feeder 3 and from thence to a recrystallizer 6 together with an organic liquid for example, methanol, from feeder 12 and washings from the washer 7B. The resulting suspension is fed to the separator 7A and the crystals are separated and washed in the washer 7B. The product is finally dried in the dryer 8 to form a product 9. Heat is supplied at 10. The liquor from the separator 7A containing phosphoric acid residual potassium phosphate and the organic liquid is fed to a distillation column 11 where the organic liquid is recovered and the phosphoric acid and potassium phosphate is concentrated in the evaporator 14 and water is removed at 17. The resulting solution is fed back to the reactor at 15 as shown or alternatively it may be used for the manufacture of pure phosphates and drawn off at 16.

A particularly advantageous feature of the invention is its ready adaptability to a continuous operation. A major portion of the continuous operation is shown in the drawing in the aspects of continuous reuse of the organic solvent with recovery in column 11, storage in organic liquid supply 13 for use via organic liquid feeder 12. Also the phosphoric acid solution recovered from distillation column 11 may be evaporated in evaporator 14 to the desired concentration and recycled for reaction with the potash. Moreover, a portion of this recovered phosphoric acid solution may also be withdrawn for the manufacture of other phosphates. Accordingly, the process is one in which substantial economies in operation are achieved because of the easy adaptation to continuous operation.

The invention is exemplified by the following working example but it is not to be considered as limited thereto.

EXAMPLE

Potassium chloride and purified recycle phosphoric acid (70.3% $P_2O_5$) were reacted together continuously at a temperature of 250° C. in such proportions as to give a P to K mole ratio in the reactor of 2:1. The liquid residence time was 2¼ hours. The chloride level in the reactor product was less than 0.1%.

Wet process phosphoric acid (50% $P_2O_5$) was added and the mixture heated at 100° C. for 1 hour. The resulting mixture, called hydrolyzed liquor had a P to K mole ratio of 4:1.

Impure potassium phosphate was precipitated by the addition of methanol to the hydrolyzed liquor in the ratio of 0.75 to 1 on a weight basis. The solids were filtered, washed with methanol and removed from the system. The acid filtrate was fed to a distillation column and the methanol removed. The resulting bottoms solution containing 56.1% $P_2O_5$ was evaporated to yield superphosphoric acid (70.3% $P_2O_5$). One third of the evaporated acid was removed from the system as superphosphoric acid substantially free of all impurities except potassium. The remaining superphosphoric acid was fed back to the reactor with potassium chloride. The impure potassium phosphate contained 46% $P_2O_5$ and 31% $K_2O$.

The invention has been described with reference to certain preferred embodiments. However as obvious variations thereon will become apparent to those skilled in the art thereto.

What is claimed is:

1. A process for the production of potassium dihydrogen phosphate comprising:
   (1) reacting potassium chloride with concentrated phosphoric acid having a $P_2O_5$ content of about 60–80% wherein the amount of phosphoric acid reacted is an sufficient excess over stoichiometric quantities to provide a P:K molar ratio in the reaction of about 1.8:1 to 5:1, and wherein the reaction is conducted by contacting the reactants at a temperature of about 180–325° C. with hydrogen chloride evolution to form a reaction mixture containing complex potassium phosphate compounds;
   (2) contacting the resultant reaction mixture with water or mixtures containing water to hydrolyze any complex phosphate present in the mixture;
   (3) contacting the hydrolyzed mixture with a low boiling point water soluble organic liquid selected from the group of lower alkyl alcohols, lower alkyl ketones, or mixtures thereof in a weight ratio of liquid to hydrolyzed mixture of about 0.5:1 to 3:1 to precipitate the potassium dihydrogen phosphate as a solid and provide a solution of phosphoric acid in the organic liquid;
   (4) removing the potassium dihydrogen phosphate as a solid; and
   (5) removing the organic liquid and recovering the phosphoric acid.

2. A process according to claim 1 wherein the concentrated phosphoric acid reactant has a $P_2O_5$ content of about 70–75% and the reaction is conducted at a temperature range of 250–300° C.

3. A process according to claim 2 wherein a sufficient excess of phosphoric acid is used to provide a P to K molar ratio of 1.9:1 to 2.5:1.

4. A process according to claim 3 wherein the treatment with the organic liquid is conducted at a temperature of about 20–60° C.

5. A process according to claim 4 wherein the hydrolysis step is conducted by contacting the resultant reaction mixture with a portion of the aqueous phosphoric acid fed to step (1).

6. A continuous process for the production of potassium dihydrogen phosphate which comprises the steps of:
   (1) continuously reacting potassium chloride with concentrated phosphoric acid having a $P_2O_5$ content of about 60–80% wherein the amount of phosphoric acid reacted is in sufficient excess over stoichiometric quantities to provide a P:K molar ratio in the reaction of about 1.8:1 to 5:1, and wherein the reaction is conducted by contacting the reactants at a temperature of about 180–325° C. with hydrogen chloride evolution to form a reaction mixture containing complex potassium phosphate compounds;
   (2) contacting the resultant reaction mixture with a portion of aqueous phosphoric acid to hydrolyze complex phosphates present in the mixture;
   (3) contacting the hydrolyzed mixture with a low boiling point water-soluble organic liquid selected from the group of lower alkyl alcohols, lower alkyl ketones or mixtures thereof in a weight ratio of liquid to hydrolyzed mixture of about 0.5:1 to 3:1 to precipitate the potassium dihydrogen phosphate as a solid and provide a solution of phosphoric acid in the organic liquid;
   (4) removing the potassium dihydrogen phosphate as a solid; and
   (5) removing the organic liquid and recycling to the precipitation step (3) and recovering the phosphoric acid.

7. A continuous process according to claim 6 wherein in step (1), the phosphoric acid has a $P_2O_5$ content of 70–75% and the reaction is conducted at a temperature of about 250–300° C. employing sufficient excess phosphoric acid to provide a P to K molar ratio of 1.9:1 to 2.5:1, in step (3) the precipitation step is conducted at a temperature of about 20–60° C. and the recovered phosphoric acid is concentrated and recycled as feed for further reaction.

References Cited

UNITED STATES PATENTS

| | | | |
|---|---|---|---|
| 2,902,341 | 9/1959 | Baniel et al. | 23—107 X |
| 2,894,813 | 7/1959 | Baniel et al. | 23—107 X |
| 1,805,873 | 3/1931 | Kaselitz | 23—107 |
| 1,865,968 | 7/1932 | Schuppe | 23—107 |
| 2,824,786 | 2/1958 | Medub-Sobet | 23—107 |

FOREIGN PATENTS

| | | | |
|---|---|---|---|
| 4,112,729 | 7/1966 | Japan | 23—107 |
| 739,119 | 11/1969 | Belgium | 23—107 |
| 1,102,711 | 3/1961 | Germany | 23—107 |
| 1,272,905 | 7/1968 | Germany | 23—107 |

EDWARD J. MEROS, Primary Examiner

G. A. HELLER, Assistant Examiner

U.S. Cl. X.R.

71—34, 43